US012562515B2

(12) United States Patent
Lee

(10) Patent No.: US 12,562,515 B2
(45) Date of Patent: Feb. 24, 2026

(54) THREE-PHASE TERMINAL BLOCK HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 412 days.

(21) Appl. No.: 18/224,038

(22) Filed: Jul. 19, 2023

(65) Prior Publication Data

US 2024/0305020 A1 Sep. 12, 2024

(30) Foreign Application Priority Data

Mar. 8, 2023 (KR) ........................ 10-2023-0030353

(51) Int. Cl.
*H01R 9/00* (2006.01)
*H01R 9/24* (2006.01)

(52) U.S. Cl.
CPC .................................. *H01R 9/2425* (2013.01)

(58) Field of Classification Search
CPC .................................................... H01R 9/2425
See application file for complete search history.

(56) References Cited

U.S. PATENT DOCUMENTS

| | | | | |
|---|---|---|---|---|
| 9,882,294 | B1 * | 1/2018 | Jeong | H01R 4/44 |
| 11,322,865 | B2 * | 5/2022 | Yang | H01R 43/20 |
| 11,489,334 | B2 | 11/2022 | Lee | |
| 2023/0299513 | A1 | 9/2023 | Lee | |
| 2024/0120668 | A1 * | 4/2024 | Pallesen | H01R 9/2425 |

FOREIGN PATENT DOCUMENTS

| | | | |
|---|---|---|---|
| KR | 10-1625493 | B1 | 5/2016 |
| KR | 10-2019-0098085 | A | 8/2019 |
| KR | 10-2022-0000630 | A | 1/2022 |
| KR | 10-2434708 | B1 | 8/2022 |

OTHER PUBLICATIONS

Notice of Allowance mailed on Mar. 2, 2025 from Korean Patent Office for Application No. 10-2023-0030353.
Non-final Office Action mailed Aug. 6, 2024 from the Korean Patent Office for Korean Application No. 10-2023-0030353.

* cited by examiner

*Primary Examiner* — Pete T Lee
(74) *Attorney, Agent, or Firm* — Insight Law Group, PLLC; Seung Lee

(57) ABSTRACT

The present disclosure relates to a three-phase terminal block having a leakage current limiting function, in which a leakage current may be limited by expanding an area of a neutral line of a three-phase four-wire line connected to the terminal block, and thus the risk of electric shock to the human body due to the leakage current may be minimized.

3 Claims, 2 Drawing Sheets

THREE-PHASE TERMINAL BLOCK HAVING LEAKAGE CURRENT LIMITING FUNCTION

CROSS-REFERENCE TO RELATED APPLICATION

This application claims priority to and the benefit of Korean Patent Application No. 10-2023-0030353 filed on Mar. 8, 2023, the disclosure of which is incorporated herein by reference in its entirety.

BACKGROUND

1. Field of the Invention

The present disclosure relates to a terminal block, and particularly, to a terminal block having a leakage current limiting function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a three-phase terminal block having a leakage current limiting function, which may limit a leakage current by expanding an area of a neutral line of a three-phase four-wire line connected to the terminal block.

RELATED ART DOCUMENT

Patent Document

Korean Patent Registration No. 10-1625493 (published on May 30, 2016)

SUMMARY OF THE INVENTION

The present disclosure is directed to providing a three-phase terminal block having a leakage current limiting function, which may limit a leakage current by expanding an area of a neutral line of a three-phase four-wire line connected to the terminal block.

A three-phase terminal block having a leakage current limiting function includes a first-phase conductor electrode having both ends to which a primary-side first-phase voltage line (R line) and a secondary-side first-phase voltage line (R line) of a three-phase four-wire line are electrically connected, a second-phase conductor electrode having both ends to which a primary-side second-phase voltage line (S line) and a secondary-side second-phase voltage line (S line) of the three-phase four-wire line are electrically connected, a third-phase conductor electrode having both ends to which a primary-side third-phase voltage line (T line) and a secondary-side third-phase voltage line (T line) of the three-phase four-wire line are electrically connected, and a neutral line area expansion unit that has both ends to which a primary-side neutral line (N line) and a secondary-side neutral line (N line) of the three-phase four wire line are electrically connected and limits leakage current by expanding the areas of the neutral lines.

The neutral line area expansion unit may be implemented in a plurality of cylindrical conductor shapes surrounding the first-phase conductor electrode, the second-phase conductor electrode, and the third-phase conductor electrode.

The neutral line area expansion unit may be implemented in a single cylindrical conductor shape simultaneously surrounding the first-phase conductor electrode, the second-phase conductor electrode, and the third-phase conductor electrode.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
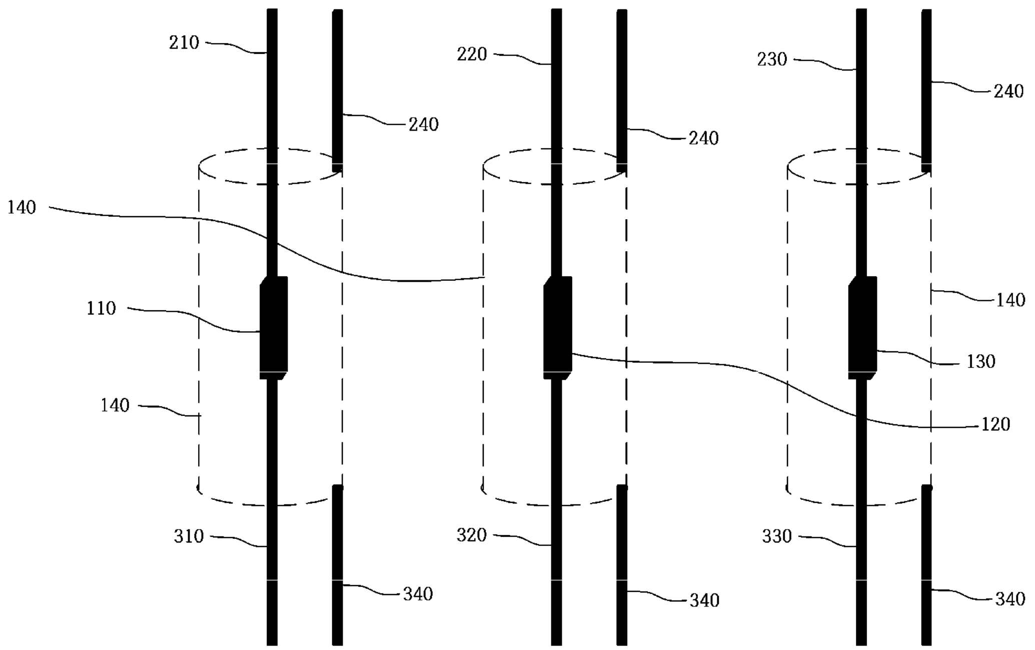
FIG. 1 is a view illustrating a configuration of a three-phase terminal block having a leakage current limiting function according to an embodiment of the present disclosure.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

Figure 2:
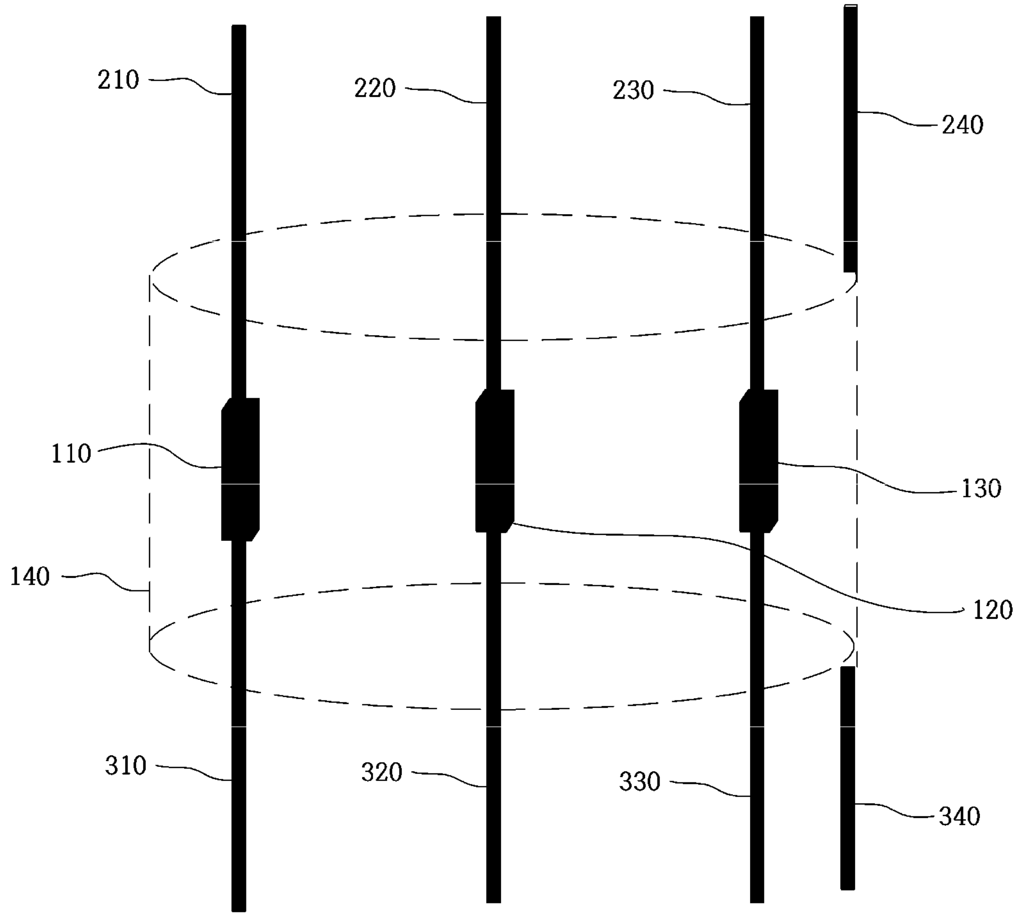
FIG. 2 is a view illustrating a configuration of a three-phase terminal block having a leakage current limiting function according to another embodiment of the present disclosure.

FIG. 1 is a view illustrating a configuration of a three-phase terminal block having a leakage current limiting function according to an embodiment of the present disclosure, and FIG. 2 is a view illustrating a configuration of a three-phase terminal block having a leakage current limiting function according to another embodiment of the present disclosure.

As illustrated in FIGS. 1 and 2, a three-phase terminal block 100 having a leakage current limiting function according to the present disclosure includes a first-phase conductor electrode 110, a second-phase conductor electrode 120, a third-phase conductor electrode 130, and a neutral line area expansion unit 140.

A primary-side first-phase voltage line (R line) 210 and a secondary-side first-phase voltage line (R line) 310 of a three-phase four-wire line are electrically connected to both ends of the first-phase conductor electrode 110. For example, the first-phase conductor electrode 110 may be mounted on a terminal block substrate (not illustrated) mounted in a housing (not illustrated), and the primary-side first-phase voltage line (R line) 210 and the secondary-side first-phase voltage line (R line) 310 may be electrically connected to both ends of the first-phase conductor electrode 110 by a screw coupling method or a solder joint method.

A primary-side second-phase voltage line (S line) 220 and a secondary-side second-phase voltage line (S line) 320 of the three-phase four-wire line are electrically connected to both ends of the second-phase conductor electrode 120. For example, the second-phase conductor electrode 120 may be mounted on the terminal block substrate mounted in the housing, and the primary-side second-phase voltage line (S line) 220 and the secondary-side second-phase voltage line (S line) 320 may be electrically connected to both ends of the second-phase conductor electrode 120 by a screw coupling method or a solder joint method.

A primary-side third-phase voltage line (T line) 230 and a secondary-side third-phase voltage line (T line) 330 of the three-phase four-wire line are electrically connected to both ends of the third-phase conductor electrode 130. For example, the third-phase conductor electrode 130 may be mounted on the terminal block substrate mounted in the housing, and the primary-side third-phase voltage line (T line) 230 and the secondary-side third-phase voltage line (T line) 330 may be electrically connected to both ends of the third-phase conductor electrode 130 by a screw coupling method or a solder joint method.

A primary-side neutral line (N line) 240 and a secondary-side neutral line (N line) 340 of the three-phase four-wire line are electrically connected to both ends of the neutral line area expansion unit 140, and a leakage current is limited by expanding an area of the neutral line. For example, a neutral line area expansion unit 140 made of a conductive material may be mounted on the terminal block substrate mounted in the housing, and the primary-side neutral line (N line) 240 and the secondary-side neutral line (N line) 340 may be electrically connected to both ends of the neutral line area expansion unit 140 by a screw coupling method or a solder joint method.

The area of the neutral line becomes greater than areas of the first-phase conductor electrode 110, the second-phase conductor electrode 120, and the third-phase conductor electrode 130 by the neutral line area expansion unit 140, and thus the leakage current becomes very small. Further, as the leakage current decreases, the risk of electric shock decreases, and thus the risk of electric shock to the human body due to the leakage current may be minimized.

The reason for this, as disclosed in Korean Patent Registration No. 10-1625493 (published on May 30, 2016), is that the leakage current gradually decreases as the area of the flat plate-shaped conductor (corresponding to the neutral line area expansion unit 140 of the present disclosure) connected to a negative terminal is greater than the area of a flat plate-shaped conductor (corresponding to the first-phase conductor electrode 110, the second-phase conductor electrode 120, and the third-phase conductor electrode 130 of the present disclosure) connected to a positive terminal of a power source.

In detail, a closed loop is not normally configured in a portion where an area is expanded by the neutral line area expansion unit 140, but when the three-phase terminal block 100 having a leakage current limiting function is submerged in water due to flooding, the closed loop is configured.

In this process, a current leaked through the first-phase conductor electrode 110, the second-phase conductor electrode 120, or the third-phase conductor electrode 130 of the three-phase terminal block 100 having a leakage current limiting function does not flow to the human body having a relatively very large resistance but flows to the neutral line area expansion unit 140 through water and is drawn into the neutral line. Thus, the leakage current is prevented from flowing to the human body to minimize the risk of electric shock to the human body.

By this implementation, according to the present disclosure, since the leakage current may be limited by expanding the area of the neutral line of the three-phase four-wire line connected to the terminal block, the risk of electric shock to the human body due to the leakage current may be minimized.

Meanwhile, according to an additional aspect of the present disclosure, the neutral line area expansion unit 140 may be implemented in a plurality of cylindrical conductor shapes surrounding the first-phase conductor electrode 110, the second-phase conductor electrode 120, and the third-phase conductor electrode 130.

Referring to FIG. 1, the neutral line area expansion unit 140 may be implemented in the plurality of cylindrical conductor shapes surrounding the first-phase conductor electrode 110, the second-phase conductor electrode 120, and the third-phase conductor electrode 130.

By this implementation, according to the present disclosure, the area of the neutral line of the three-phase four-wire line connected to the terminal block is expanded through the neutral line area expansion unit 140 having the plurality of cylindrical conductor shapes surrounding the first-phase conductor electrode 110, the second-phase conductor electrode 120, and the third-phase conductor electrode 130. Thus, the leakage current may be limited.

Meanwhile, according to an additional aspect of the present disclosure, the neutral line area expansion unit 140 may be implemented in a single cylindrical conductor shape simultaneously surrounding the first-phase conductor electrode 110, the second-phase conductor electrode 120, and the third-phase conductor electrode 130.

Referring to FIG. 2, it may be seen that the neutral line area expansion unit 140 may be implemented in the single cylindrical conductor shape simultaneously surrounding the first-phase conductor electrode 110, the second-phase conductor electrode 120, and the third-phase conductor electrode 130.

By this implementation, according to the present disclosure, the area of the neutral line of the three-phase four-wire line connected to the terminal block is expanded through the neutral line area expansion unit 140 having the single cylindrical conductor shape simultaneously surrounding the first-phase conductor electrode 110, the second-phase conductor electrode 120, and the third-phase conductor electrode 130. Thus, the leakage current may be limited.

As described above, according to the present disclosure, since the leakage current may be limited by expanding the area of the neutral line of the three-phase four-wire line connected to the terminal block, the risk of electric shock to the human body due to the leakage current may be minimized, and thus the purpose of the prevent disclosure presented above can be achieved.

According to the present disclosure, since a leakage current can be limited by expanding an area of a neutral line of a three-phase four-wire line connected to a terminal block, the risk of electric shock to the human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. A three-phase terminal block having a leakage current limiting function, the terminal block comprising:

a first-phase conductor electrode having both ends to which a primary-side first-phase voltage line (R line) and a secondary-side first-phase voltage line (R line) of a three-phase four-wire line are electrically connected;

a second-phase conductor electrode having both ends to which a primary-side second-phase voltage line (S line) and a secondary-side second-phase voltage line (S line) of the three-phase four-wire line are electrically connected;

a third-phase conductor electrode having both ends to which a primary-side third-phase voltage line (T line) and a secondary-side third-phase voltage line (T line) of the three-phase four-wire line are electrically connected; and a neutral line area expansion unit that has both ends to which a primary-side neutral line (N line) and a secondary-side neutral line (N line) of the three-phase four wire line are electrically connected and limits leakage current by expanding the areas of the neutral lines.

2. The three-phase terminal block of claim 1, wherein the neutral line area expansion unit is implemented in a plurality of cylindrical conductor shapes surrounding the first-phase conductor electrode, the second-phase conductor electrode, and the third-phase conductor electrode.

3. The three-phase terminal block of claim 1, wherein the neutral line area expansion unit is implemented in a single cylindrical conductor shape simultaneously surrounding the first-phase conductor electrode, the second-phase conductor electrode, and the third-phase conductor electrode.

* * * * *